US008963809B1

United States Patent
Kohn et al.

(10) Patent No.: US 8,963,809 B1
(45) Date of Patent: Feb. 24, 2015

(54) HIGH PERFORMANCE CACHING FOR MOTION COMPENSATED VIDEO DECODER

(75) Inventors: Leslie D. Kohn, Saratoga, CA (US); Sydney D. Reader, Milpitas, CA (US)

(73) Assignee: Ambarella, Inc., Santa Clara, CA (US)

( * ) Notice: Subject to any disclaimer, the term of this patent is extended or adjusted under 35 U.S.C. 154(b) by 115 days.

(21) Appl. No.: 13/547,517

(22) Filed: Jul. 12, 2012

Related U.S. Application Data (63) Continuation of application No. 12/688,113, filed on Jan. 15, 2010, now Pat. No. 8,225,043.

(51) Int. Cl.
G09G 3/28 (2013.01)
G09G 3/29 (2006.01)

(52) U.S. Cl.
CPC .......................... G09G 3/29 (2013.01)
USPC ............................................... 345/61

(58) Field of Classification Search
USPC ........................................ 345/647, 568, 571
See application file for complete search history.

(56) References Cited

U.S. PATENT DOCUMENTS

| | | | | |
|---|---|---|---|---|
| 5,809,526 A | * | 9/1998 | Patel ............................. | 711/122 |
| 7,809,888 B1 | * | 10/2010 | Clark et al. ................... | 711/118 |
| 2004/0141554 A1 | | 7/2004 | Phong et al. .............. | 375/240.12 |
| 2005/0111284 A1 | | 5/2005 | Akiyama et al. ............... | 365/222 |
| 2006/0050976 A1 | * | 3/2006 | Molloy .......................... | 382/233 |
| 2006/0053255 A1 | | 3/2006 | Sugizaki ........................ | 711/122 |
| 2007/0064006 A1 | * | 3/2007 | Saxena .......................... | 345/557 |
| 2007/0230573 A1 | * | 10/2007 | Iguchi et al. .............. | 375/240.12 |
| 2009/0119454 A1 | * | 5/2009 | Brooks .......................... | 711/118 |
| 2010/0226435 A1 | | 9/2010 | Riemens et al. .......... | 375/240.16 |

OTHER PUBLICATIONS

Tsai et al., "Low Power Cache Algorithm and Architecture Design for Fast Motion Estimation in H.264/AVC Encoder System," IEEE International Conference on Acoustics, Speech and Signal Processing, pp. II-97-II-100, Apr. 15-20, 2007.

* cited by examiner

Primary Examiner — Ke Xiao
Assistant Examiner — Raffi Isanians
(74) Attorney, Agent, or Firm — Christopher P. Maiorana, PC (57) ABSTRACT

A method for high performance caching is disclosed. The method generally includes steps (A) and (B). Step (A) may fetch a plurality of reference samples of a reference image from a first circuit to a cache of a second circuit. The cache may include a plurality of cache blocks and a plurality of valid bits. Each of the cache blocks generally corresponds to at most one of the valid bits. A size of the cache blocks may match a smallest read access size of the first circuit. Step (B) may transfer the reference samples having the corresponding valid bit set to valid from the cache to a processor of the second circuit.

20 Claims, 5 Drawing Sheets

HIGH PERFORMANCE CACHING FOR MOTION COMPENSATED VIDEO DECODER

This is a continuation of U.S. Ser. No. 12/688,113, now U.S. Pat. No. 8,225,043 filed Jan. 15, 2010, which is incorporated by reference.

FIELD OF THE INVENTION

The present invention relates to a method and/or architecture for digital video coding generally and, more particularly, to high performance caching for a motion compensated video decoder.

BACKGROUND OF THE INVENTION

Conventional inter-frame video compression techniques use motion compensated reference frames to reconstruct a current frame. In a conventional video decoder system, the reference frames are typically stored in an external dynamic random access memory (DRAM) chip. The DRAM chip is separate from the decoder processor chip because the specified memory capacity is too large to fit on the decoder processor chip economically.

Power consumed in transferring the reference data to and from the DRAM in portable high-definition video decoder implementations is a problem. The power consumption is especially noticeable with complex motion compensation such as with H.264 encoded video. Other functions that access the DRAM, such as graphical user interface processing, are often bottlenecked by the reference data transfers. A reduction in the average DRAM bandwidth can be achieved by caching recently used motion compensation data on the processor chip. However, traditional set associative caches have problems when used in such applications. If the cache block is too big, a large percentage of the data may not be used before the cache block is replaced. Dumping unused data from the cache can use more DRAM bandwidth and more power than not having any cache. If the cache block is small, the associated address tag can consume a large percentage of the cache size. For example, given a 16-byte block size and a 18-bit address tag, the overhead caused by the address tag is approximately 14% of the total cache utilization. In addition, the area and power of the tag compare logic increases as the number of parallel tag compares increases. For example, multiple sets of N-bit tag compare logic are used per cache way in an associative cache (i.e., 8 sets of 18-bit tag compare logic for each cache way in an 8-way set associative cache). Furthermore, the DRAM overhead of processing many small cache blocks misses is normally greater than processing fewer larger cache misses because of a large DRAM latency associated with each cache miss.

A caching technique is desired that reduces the DRAM bandwidth utilization to save power consumed in transferring the data.

SUMMARY OF THE INVENTION

The present invention concerns a method for high performance caching. The method generally includes steps (A) and (B). Step (A) may fetch a plurality of reference samples of a reference image from a first circuit to a cache of a second circuit. The cache may include a plurality of cache blocks and a plurality of valid bits. Each of the cache blocks generally corresponds to at most one of the valid bits. A size of the cache blocks may match a smallest read access size of the first circuit. Step (B) may transfer the reference samples having the corresponding valid bit set to valid from the cache to a processor of the second circuit.

The objects, features and advantages of the present invention include providing high performance caching for a motion compensated video decoder that may (i) reduce DRAM bandwidth utilization, (ii) reduce power consumed in transferring data to and from the DRAM, (iii) minimize cache misses, (iv) minimize overhead data stored in the cache and/or (v) perform parallel adjacent block hit/miss detection using a single bit per block.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Poor cache utilization associated with common cache techniques is generally avoided by minimizing overhead and minimizing the probability of a cache miss during normal video codec operations. Rather than storing an address tag for each cache block, cache storage is limited to reference samples that are within a certain vertical range of a vertical position of a current target block. For example, only reference samples (e.g., luminance samples and chrominance samples) that are within a predetermined number (e.g., ±32) of pixels vertically from a current vertical block (or macroblock) offset may be fetched from an external memory into the cache. Reference samples beyond the predetermined number of pixels may be fetched but not stored in the cache.

Figure 1:
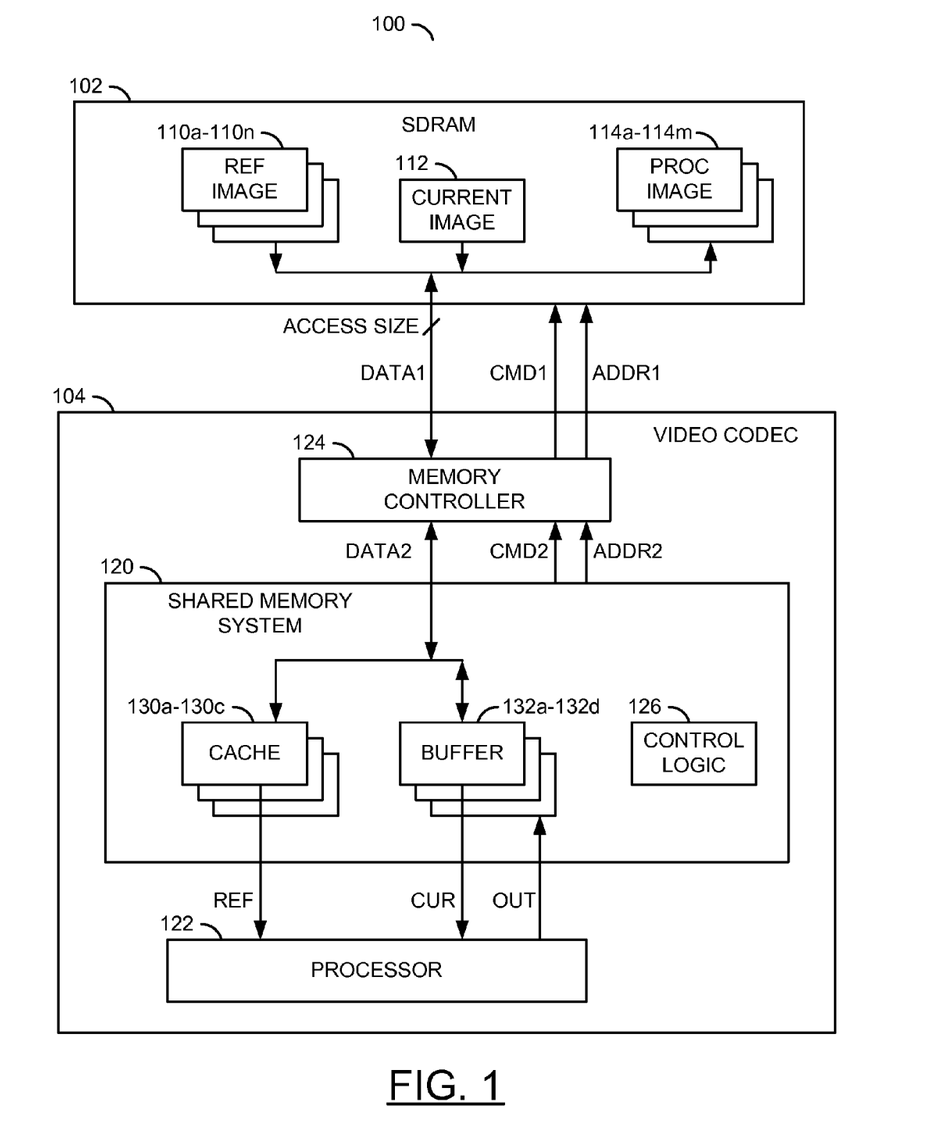
FIG. 1 is a block diagram of an example implementation of an apparatus in accordance with a preferred embodiment of the present invention.

Referring to FIG. 1, a block diagram of an example implementation of an apparatus 100 is shown in accordance with a preferred embodiment of the present invention. The apparatus (or system) 100 may implement a video codec circuit. In some embodiments, the apparatus 100 may implement a video encoder. In other embodiments, the apparatus 100 may implement a video decoder. In still other embodiments, the apparatus 100 may implement both a video encoder and a video decoder.

The apparatus 100 generally comprises a circuit (or module) 102 and a circuit (or module) 104. A signal (e.g., ADDR1) may be generated by the circuit 104 and received by the circuit 102. The circuit 104 may also generate a signal (e.g., CMD1) received by the circuit 102. A signal (e.g., DATA1) may be exchanged between the circuit 102 and the circuit 104. The circuits 102 and 104 may be implemented in hardware, software, firmware or any combination thereof.

The circuit 102 may implement an external memory circuit. The circuit 102 is generally operational to buffer video data used during encoding operations and/or decoding operations. Control of the circuit 102 may be achieved through addresses received in the signal ADDR1 and commands received in the signal CMD1. The video data may include, but is not limited to multiple reference images (e.g., pictures, frames, fields) 110a-110n, one or more current images 112 and data of one or more processed images 114a-114m. Reference samples of the reference images 110a-110n may be transferred between the circuit 102 and the circuit 104 in the signal DATA1. The signal DATA1 may also carry current samples of the current image 112. Processed samples of the processed images 114a-114m may be transferred from the circuit 104 to the circuit 102 in the signal DATA1. The circuit 102 is generally fabricated on a chip (or die). In some embodiments, the circuit 102 may implement a double data rate (DDR) synchronous dynamic random access memory (SDRAM). Other memory technologies may be implemented to meet the criteria of a particular application. The circuit 104 may implement a video processor circuit.

The circuit 104 may be operational to encode and/or decode video data. The decoding generally involves reconstructing images relative to one or more of the reference images 110a-110n. The encoding generally involves processing the current image 112 relative to of one or more of the reference images 110a-110n. Reference samples, current samples and processed samples may be exchanged with the circuit 102 through the signal DATA1. Read/write access to the circuit 102 may be controlled by the circuit 104 using the signal ADDR1 and the signal CMD1. The circuit 104 is generally fabricated on a chip (or die) different than the chip for the circuit 102.

The circuit 104 generally comprises a circuit (or module) 120, a circuit (or module) 122 and a circuit (or module) 124. The signal DATA1 may be received by the circuit 124. A signal (e.g., REF) may be generated by the circuit 120 and received by the circuit 122. The circuit 120 may generate a signal (e.g., CUR) that is also received by the circuit 122. A signal (e.g., OUT) may be generated by the circuit 122 and received by the circuit 120. The signal ADDR1 and the signal CMD1 may be generated by the circuit 124. A signal (e.g., ADDR2) may be generated by the circuit 120 and received by the circuit 124. A signal (e.g., CMD2) may be generated by the circuit 120 and received by the circuit 124. A signal (e.g., DATA2) may be exchanged between the circuit 120 and the circuit 124. The circuits 120 to 124 may be implemented in hardware, software, firmware or any combination thereof.

The circuit 120 may implement a shared memory system. The circuit 120 is generally operational to buffer data (i) exchanged with the circuit 102, (ii) used by the circuit 122 and (iii) generated by the circuit 122. The circuit 120 may be logically configured as one or more caches and/or one or more buffers allocated to a portion of the shared memory and associated control registers of circuit 120. Internal control logic 126 may generate the signal ADDR2, the signal CMD2 and internal memory addresses and controls based on requests received from the circuit 122.

The caches may include multiple numbers of caches. For example, one or more caches 130a-130c may be allocated in the circuit 120 in support of the video codec operations. For operations involving several reference images at once, a cache 130a-130c may be set up each reference image involved in the operations. One or more buffers 132a-132d may also reside in the circuit 120 simultaneously with the caches 130a-130c. The caches 130a-130c and the buffers 132a-132d may be set up and torn down as appropriate by the circuit 122.

The circuit 122 may implement a processor. The circuit 122 is generally operational to perform various video codec operations on the video data buffered in the circuit 120. The video codec operations may include video encoding, video decoding or both.

When decoding the video data, the circuit 122 may be operational to generate motion compensated reference blocks by performing motion compensations on the reference samples. Afterwards, the motion compensated reference blocks may be added to residual blocks to generated reconstructed blocks. The reconstructed blocks may be stored in the circuit 102 as part of a processed image (e.g., 114a).

When encoding the video data, the circuit 122 may be operational to generate interpolated reference samples from the original reference samples. The interpolated reference samples may be used as part of a motion estimation operation to establish motion vectors for blocks in the current image 112. Other video codec operations may be implemented to meet the criteria of a particular application.

The circuit 124 may implement a memory controller. The circuit 124 may be operational to control the circuit 102. The circuit 124 may generate the signal ADDR1 and the signal CMD1 to control reading from and writing to the different addressable locations in the circuit 102. The signal ADDR1 and the signal CMD1 may be based on the signal ADDR2 and the signal CMD2 received from the circuit 120. Read/write access to the circuit 102 may be based on a smallest access size of the data carried by the signal DATA1. For example a DDR2 memory having a 32-bit external data width and a 4 word minimum burst mode may have a smallest access size of 16 bytes (e.g., 4 words/access at 4 bytes/word). The signal DATA2 may be used to transfer data between the circuit 120 and the circuit 124.

Figure 2:
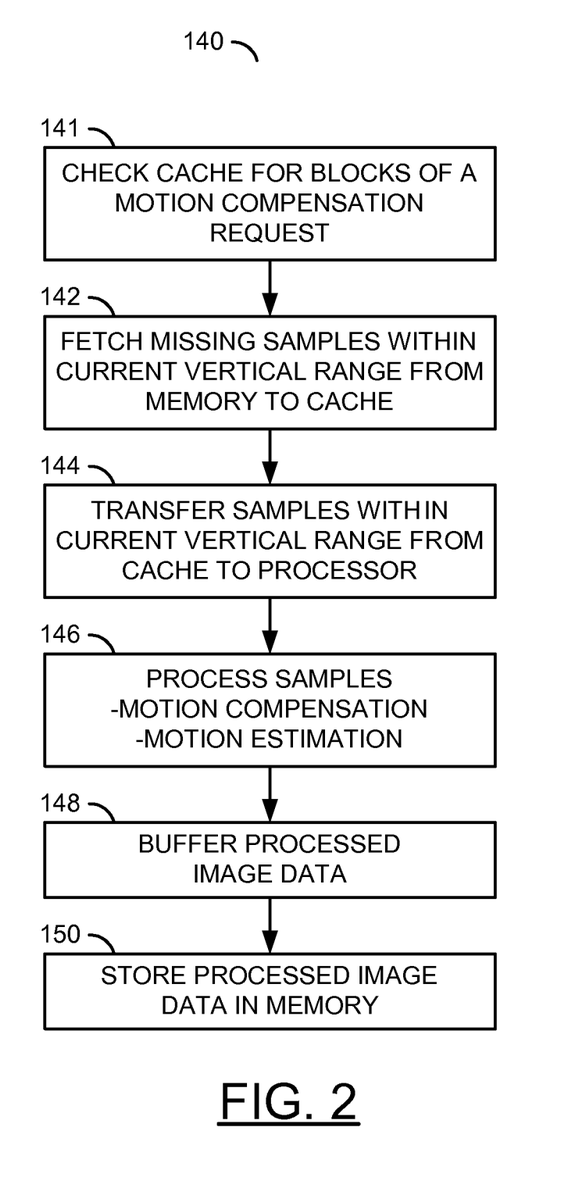
FIG. 2 is a flow diagram of an example implementation of a video process.

Referring to FIG. 2, a flow diagram of an example implementation of a video process 140 is shown. The process 140 generally comprises a step (or block) 141, a step (or block) 142, a step (or block) 144, a step (or block) 146, a step (or block) 148 and a step (or block) 150. The process (or method) 140 may be implemented by the apparatus 100.

In the step 141, a check may be performed by the circuit 126 to see which blocks of a motion compensation request are in an allocated cache (e.g., cache 130a). In the step 142, the circuit 126 may instruct the circuit 124 to fetch the missing reference samples of a reference image (e.g., 110a) within a current vertical range from the circuit 102. The reference samples are generally passed through the signals DATA1 and DATA2 to the cache 130a. From the cache 130a, the reference samples within the current vertical range may be transferred in the signal REF to the circuit 122 in the step 144. During encoding, the current sample may be transferred in the signal CUR from the circuit 120 to a buffer (e.g., buffer 132a) in the circuit 122. The steps 142 and 144 are generally limited to the blocks which are in the current vertical range. Some blocks outside the current vertical range may be fetched from the circuit 102 and passed directly to the step 146.

The circuit 122 may perform one or more decoding processes or one or more encoding processes in the step 146 using the reference samples received from the circuit 120. The circuit 122 may write the results of the processes via the signal OUT into another buffer (e.g., 132d) in the circuit 120 in the step 148. During decoding, the circuit 124 may control a transfer of the processed data from the buffer 132d for storage in the circuit 102 as part of a processed image (e.g., 114a) in the step 150.

Figure 3:
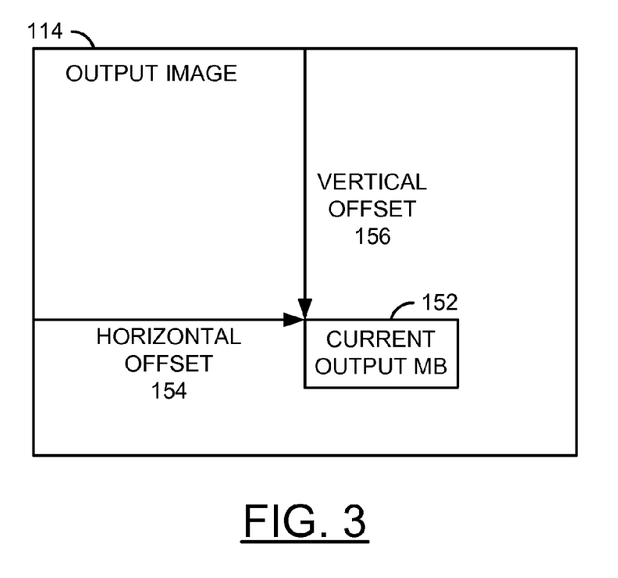
FIG. 3 is a block diagram of an output image residing in a memory.

Referring to FIG. 3, a block diagram of an output image 114 residing in the circuit 102 is shown. The output image 114 may be representative of the individual images 114a-114m shown in FIG. 1. During decoding, the circuit 124 may internally store residual blocks recreated from an encoded bitstream. Decoding generally operates on the residual blocks in a raster order moving left-to-right and top-to-bottom to generate the reconstructed output image 114. A spatial position of a current output macroblock 152 being reconstructed may be identified by a horizontal offset 154 from a left edge of the output image 114 and a vertical offset 156 from a top edge of the output image 114. In some embodiments, the horizontal offset 154 and the vertical offset 156 may point to an upper-left pixel location of the current output macroblock 152.

Figure 4:
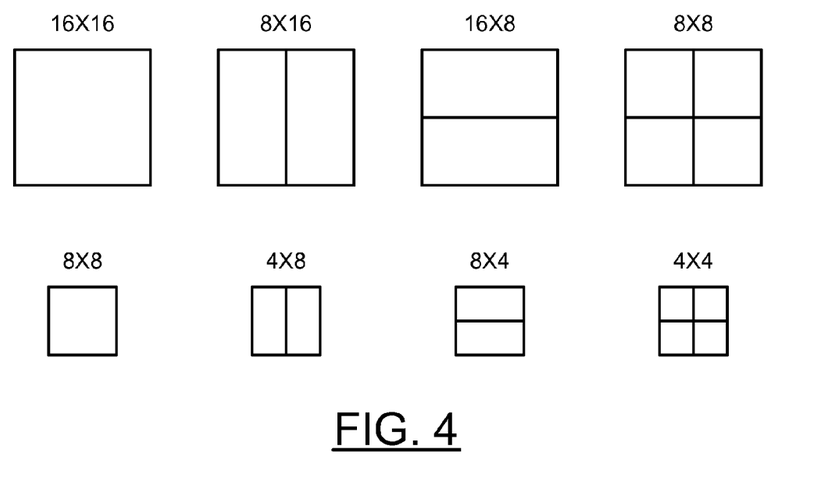
FIG. 4 is a block diagram of partitions and sub-partitions in accordance with H.264.

Referring to FIG. 4, a block diagram of partitions and sub-partitions in accordance with H.264 are shown. Depending on the video standard (e.g., MPEG-2, H.263, H264, etc.), motion compensation for macroblocks may split each macroblock into one or more partitions and/or multiple sub-partitions. For example, H.264 generally specifies block partitions of 16×16, 16×8, 8×16, 8×8, 8×4, 4×8 and 4×4 luminance samples, as illustrated. Proportionally smaller chrominance blocks may also be specified. Generally, each of the partitions/sub-partitions may be either a square or a rectangle. The rectangles may have a vertical size and a horizontal size that vary from each other by no more than a factor of two (e.g., H=2V or V=2H).

Selection of the partitions/sub-partitions generally depends on the amount of detail in a macroblock. At least one motion vector may be determined for each partition/sub-partition. Therefore, the large partitions may have fewer motion vectors than the smaller sub-partitions and so use less bits to code the motion vectors. However, the smaller partitions may produce lower-energy motion compensated residuals than the large partitions in detailed areas of an image. As such, larger partitions may be more efficient in homogeneous areas of the image and smaller sub-partitions may be more efficient in the detailed areas.

Figure 5:
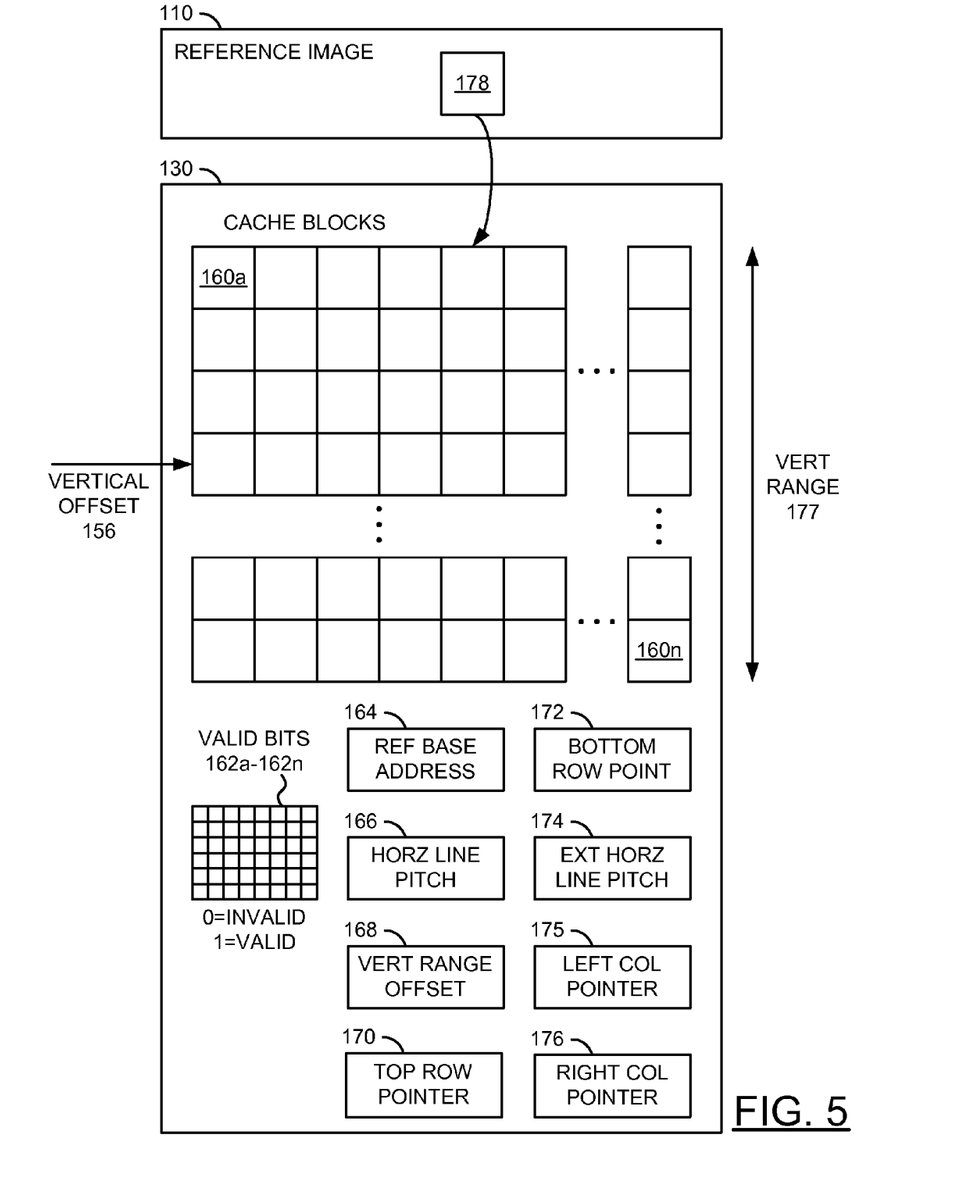
FIG. 5 is a block diagram of an example cache.

Referring to FIG. 5, a block diagram of an example cache 130 is shown. The cache 130 may represent the individual caches 130a-130c shown in FIG. 1. A reference image 110 may represent the individual reference images 110a-110n. The cache 130 may be implemented as part of a larger shared memory structure of the circuit 120. The cache 130 generally comprises multiple cache blocks 160a-160n, multiple valid bits 162a-162n, a reference image base address 164, a horizontal pitch value 166, a vertical range offset 168, a top row pointer 170, a bottom row pointer 172, an external horizontal line pitch value 174 for the circuit 102, an optional left column pointer 175 and an optional right column pointer 176. No address tags of the reference samples may be stored in the cache 130. The reference image base address 164, the horizontal pitch value 166, the vertical range offset 168 and the external horizontal pitch value 174 may be used to calculate the addresses used to fetch the data from the circuit 102 to the cache 130. In some embodiments, the data may be uni-directionally written into the cache 130 from the circuit 102 and uni-directionally read from the cache 130 to the circuit 122.

The cache blocks 160a-160n may be limited to copies of the reference samples that fall within a vertical range 177 about the vertical offset 156 of the current output macroblock 152 (see FIG. 3). Only reference samples that are within a given vertical range of pixels (e.g., ±32 pixels) above and below the row of the current output macroblock 152 may be cached. Consider a case where a row comprises block of 4 horizontal samples by 4 vertical samples (4H×4V). Extending up and down from the current block row 32 samples in each direction generally covers 8 additional block rows above the current block row and 8 additional block rows below the current block row. Therefore, the example cache 130 would buffer 19 block rows (76 samples) in the vertical range 177. In some embodiments, the cache 130 may span the entire horizontal distance of the reference image 110. In other embodiments, the cache 130 may span less than the entire horizontal distance of the reference image 110.

A size of each cache block 160a-160n may be specified to match the smallest access size of the circuit 102. Therefore, a single read access (e.g., a burst of 4 data lines) from the circuit 102 may return enough reference samples (e.g., region 178) to fill a single cache block 160a-160n. In some embodiments, the cache blocks 160a-106n may correspond to the 4H×4V reference sample blocks within the vertical range 177 to minimize the amount of data that has to be fetched from the circuit 102 for worst case misaligned reference samples. Where each reference sample is represented by 1 byte, each 4H×4V cache block 160a-160n may hold 16 bytes of data. Hence, the 16-byte cache block size may match the 16-byte smallest access size of the 32-bit DDR2 memory system. Other cache block sizes and smallest access sizes may be implemented to meet the criteria of a particular application.

A single valid bit 162a-162n is generally provided for each cache block 160a-160n, rather than a multi-bit address tags as used in ordinary caches. The reference image base address 164, the horizontal pitch 166, the vertical range offset 168 and the external horizontal pitch 174 may be maintained within the cache 130 to provide mapping between each cache block 160a-160n and the associated addressable blocks in the circuit 102. The top row pointer 170 and the bottom row pointer 172 may be used to locate the oldest and newest cached block rows. All block rows between the oldest row and the newest row may be considered to match the spatial sequence found in the reference image 110. As a result, the overhead of the cache organization is generally less than 1 percent.

Caching a limited vertical range at any given time generally takes advantage of a condition where real video sequences have motion vectors that may be clustered around a relatively small offset from the position of the current output macroblock 152. For example in H.264 encoded data, motion vectors for high definition video may typically have vertical components of less than ±64 pixels, compared with a theoretical maximum motion vector range of ±512 pixels vertically.

Processing of the cached reference samples by the circuit 122 generally proceeds in a raster fashion from left-to-right and top-to-bottom. A target block (e.g., a motion compensated reference block) may be generated once sufficient neighboring reference samples are available in the cache 130. If the cache 130 holds an entire row of an image, the cache 130 generally discards a block row of reference samples after each row of macroblocks is processed. Such reference samples may be discarded since the data is unlikely to be referenced again during the image processing. As the target block is advanced to a next block row, the valid bits 162a-162n of the cache blocks 160a-160n holding the reference samples now outside the vertical range 177 may be set to an invalid state (e.g., a logical zero). The top row pointer 170 may be moved to the new top block row. The bottom row pointer 172 may be moved to the next available block row below the former bottom block row. Once a command has been generated to fetch the reference samples in the next bottom row from the circuit 102, the corresponding valid bits 162a-162n may be set to a valid state (e.g., a logical one).

If the cache 130 holds less than the entire row of the image, the valid bits 162a-162n may be updated and reference samples discarded (e.g., discard the leftmost column) as each macroblock is processed. As the target block is advanced to a next block column, the left column pointer 175 may be moved to the new leftmost column. The right column pointer 176 may be moved to the next available block column adjoining the former rightmost block column. Once a command has been generated to fetch the reference samples of the new rightmost column from the circuit 102, the corresponding valid bits 162a-162n may be set to the valid state.

Figure 6:
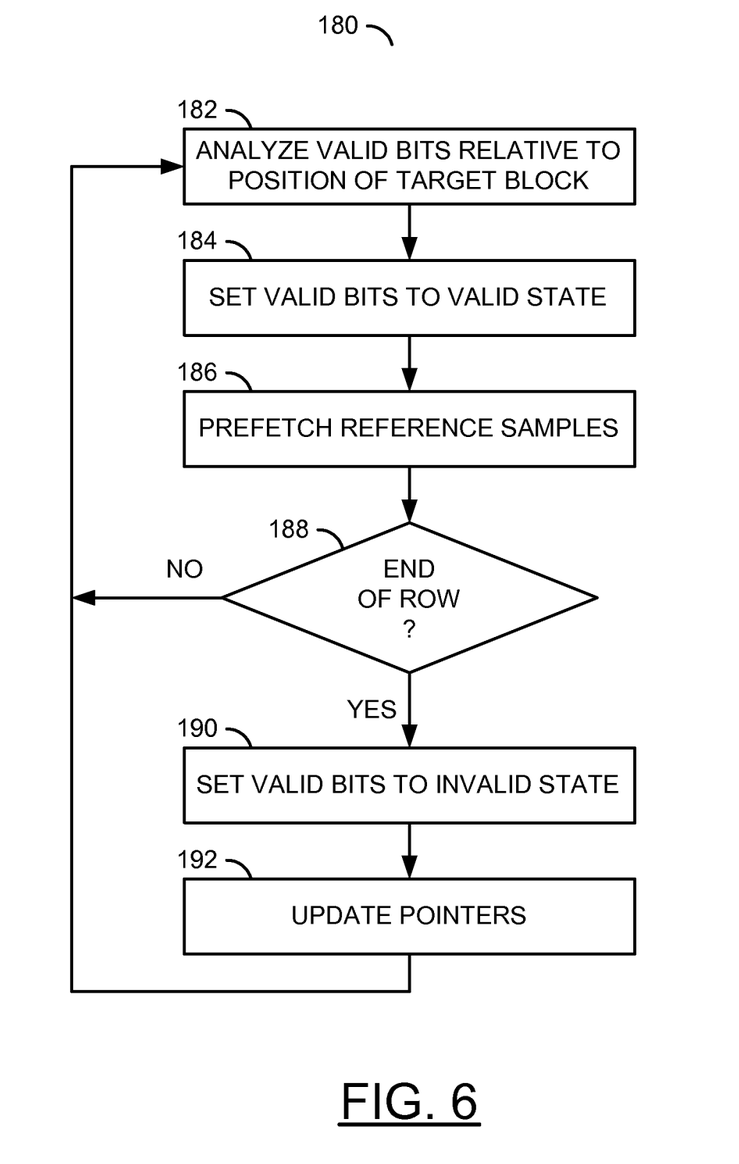
FIG. 6 is a flow diagram of an example method for controlling the cache module during a motion compensated process.

Referring to FIG. 6, a flow diagram of an example method 180 for controlling the cache 130 during a motion compensated process is shown. The method 180 generally comprises a step (or block) 182, a step (or block) 184, a step (or block) 186, a step (or block) 188, a step (or block) 190 and a step (or block) 192. The method (or process) 180 may be implemented by the control logic 126 in the circuit 120. To avoid the SDRAM overhead associated with small block sizes, the reference samples may be loaded into the module 100 using a prefetch mechanism. The prefetch mechanism generally combines several small blocks into larger SDRAM accesses by checking the valid bits 162a-162n of multiple blocks that will be accessed by a given motion compensation reference. Reference sample fetch cycles may be generated several blocks in advanced of use by the circuit 122 (e.g., sufficiently far in advance to cover the latency to access the circuit 102).

In step 182, each reference sample block that is to be fetched may be checked against the valid bits 162a-162n. The check generally identifies which parts of the reference image 110 may already be loaded in the cache 130 and which parts have yet to be fetched from the circuit 102. The valid bits 162a-162n corresponding to the missing reference blocks may be set to the valid state by the circuit 126 in the step 184 so that subsequent references to the same reference blocks by the circuit 122 do not result in redundant fetch requests. In the step 186, the circuit 126 may command one or more fetch cycles to fill the cache blocks corresponding to the missing data. As the missing reference blocks are returned from the circuit 102, the data may be loaded into the module 130.

Another check may be performed by the circuit 126 in the step 188 to determine if processing of the target block has reached the end of the current block row. If not (e.g., the NO branch of step 188), the circuit 124 may return to the step 182 to determine if one or more additional fetch cycles may be initiated. If the circuit 122 has finished using the top block row (e.g., the YES branch of step 188), the circuit 126 may set the corresponding valid bits 162a-162n to the invalid state in the step 190. The top row pointer 170 and the bottom row pointer 172 may be updated by the circuit 126 in the step 192. Afterwards, the method 180 may return to step 182 to determine if more fetch cycles may be started.

Once loaded, the reference samples may be accessed from the cache 130 and transferred to the circuit 122. The prefetch mechanism (i) generally allows the encoding/decoding to proceed at full performance even if the cache miss rate is 100% and (ii) may not fetch more data from the circuit 102 than as if the cache 130 was not present. The efficient use of the circuit 102 may be helpful to handle pathological sequences in real time.

A respective cache 130a-130n for each active reference image 110a-110n may be established in circuit 120. A flexible amount of memory space in the circuit 120 may be allocated to the caches 130a-130n for each respective reference image 110a-110n. The flexible allocation may specify the size of the vertical range 177 for each corresponding image as well as the corresponding base address 164 of the image. Therefore, the caches 130a-130n may use bigger vertical ranges for sequences with fewer reference frames (e.g., typical sequences generally have less than the legal maximum number of reference images). The shared memory structure of the circuit 120 may also be used to hold other types of data, such as other types of cache organizations to provide optimized cache organization for various usage scenarios.

The functions performed by the diagrams of FIGS. 1-6 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method for high performance caching, comprising the steps of:
   (A) fetching a plurality of reference samples of a reference image from a first circuit to a cache of a second circuit, wherein (i) said cache comprises a plurality of cache blocks, a plurality of respective valid bits, an address and a vertical offset, (ii) said cache does not use address tags that correspond to each of said cache blocks, (iii) said cache blocks map to said first circuit based on said address and said vertical offset and (iv) said vertical offset is a displacement of a target block from an image edge; and
   (B) transferring said reference samples having said respective valid bit set to valid from said cache to a processor of said second circuit.

2. The method according to claim 1, further comprising the step of:
   generating a plurality of motion compensated reference samples from said reference samples buffered in said cache, wherein said second circuit comprises a motion compensated video decoder.

3. The method according to claim 1, wherein (i) each of said cache blocks defines a rectangular region in said reference image and (ii) a horizontal size of said rectangular region and a vertical size of said rectangular region vary from each other by no greater than a factor of two.

4. The method according to claim 1, wherein said cache does not buffer said reference samples outside a vertical range about said vertical offset of said target block of an output image generated by said second circuit.

5. The method according to claim 4, wherein said vertical range is less than a maximum motion vector range of said target block.

6. The method according to claim 1, wherein (i) said cache blocks and said respective valid bits reside in a shared memory structure in said second circuit and (ii) said shared memory structure is configured to support at least one of (a) a plurality of reference frames simultaneously in respective copies of said cache, (b) a plurality of vertical range sizes and (c) one or more buffers.

7. The method according to claim 1, wherein said fetching of said reference samples does not exceed a minimum amount of data appropriate to decode said target block.

8. The method according to claim 1, further comprising the step of:
   generating a plurality of interpolated reference samples from said reference samples buffered in said cache, wherein said second circuit comprises a video encoder.

9. The method according to claim 1, wherein a horizontal size of said cache matches that of said reference image.

10. An apparatus comprising:
    a circuit comprising a cache and a processor, wherein (i) said cache comprises a plurality of cache blocks, a plurality of respective valid bits, an address and a vertical offset, (ii) said circuit is configured to (a) fetch a plurality of reference samples of a reference image from an external circuit to said cache and (b) transfer said reference samples having said respective valid bit set to valid from said cache to said processor, (iii) said cache does not use address tags that correspond to each of said cache blocks, (iv) said cache blocks map to said external circuit based on said address and said vertical offset and (v) said vertical offset is a displacement of a target block from an image edge.

11. The apparatus according to claim 10, wherein (i) said circuit is further configured to generate a plurality of motion compensated reference samples from said reference samples buffered in said cache and (ii) said circuit comprises a motion compensated video decoder.

12. The apparatus according to claim 10, wherein (i) each of said cache blocks defines a rectangular region in said reference image and (ii) a horizontal size of said rectangular region and a vertical size of said rectangular region vary from each other by no greater than a factor of two.

13. The apparatus according to claim 10, wherein said cache does not buffer said reference samples outside a vertical range about said vertical offset of said target block of an output image generated by said circuit.

14. The apparatus according to claim 13, wherein said vertical range is less than a maximum motion vector range of said target block.

15. The apparatus according to claim 10, wherein (i) said circuit further comprises a shared memory structure, (ii) said cache blocks and said respective valid bits reside in said shared memory structure and (iii) said shared memory structure is configured to support at least one of (a) a plurality of reference frames simultaneously in respective copies of said cache, (b) a plurality of vertical range sizes and (c) one or more buffers.

16. The apparatus according to claim 10, wherein said fetch of said reference samples does not exceed a minimum amount of data appropriate to decode said target block.

17. The apparatus according to claim 10, wherein (i) said circuit is further configured to generate a plurality of interpolated reference samples from said reference samples buffered in said cache and (ii) said circuit comprises a video encoder.

18. An apparatus comprising:
    means for caching comprising a plurality of cache blocks, a plurality of respective valid bits, an address and a vertical offset, wherein (i) said means for caching does not use address tags that correspond to each of said cache blocks and (ii) said vertical offset is a displacement of a target block from an image edge; and
    means for controlling configured to (i) fetch a plurality of reference samples of a reference image from an external circuit to said means for caching and (ii) transfer said reference samples having said respective valid bit set to valid from said means for caching to a means for processing, wherein said cache blocks map to said external circuit based on said address and said vertical offset.

19. The method according to claim 1, further comprising the step of:
    calculating a read address of said reference samples of said reference image based on a horizontal line pitch and a vertical range offset.

20. The method according to claim 1, wherein a size of said cache blocks matches a smallest read access size of said first circuit.

* * * * *